Jan. 9, 1951        D. F. LANGENWALTER        2,537,767

PHASE SHIFTING CONTROL CIRCUIT

Filed Sept. 25, 1948

Inventor:
Daniel F. Langenwalter,
by Claude H. Mott
His Attorney.

Patented Jan. 9, 1951

2,537,767

UNITED STATES PATENT OFFICE 2,537,767

PHASE SHIFTING CONTROL CIRCUIT

Daniel F. Langenwalter, Schenectady, N. Y., assignor to General Electric Company, a corporation of New York Application September 25, 1948, Serial No. 51,251

3 Claims. (Cl. 323—123)

This invention relates to control systems for deriving a voltage from a source of periodically varying voltage and for shifting the phase of the derived voltage with respect to the voltage of the source, and an object of the invention is the provision of a simple, sensitive, reliable and inexpensive control system of this character.

The invention is well adapted for use in connection with electric valves such as thyratrons. In control systems in which such electric valves are used, the conduction of the valve is usually controlled by shifting the phase of the voltages applied to the control grids with respect to the anode voltages.

A further object of the invention is the provision of a phase shifting circuit which will maintain a negative bias voltage which is equal to at least three times the maximum value of the negative critical grid voltage.

Another object of the invention is the provision of a phase shifting circuit which produces a voltage with a very steep wave front for all phase angles of the phase shifted voltage within 180° of the voltage of the source and which is positive for approximately 90° and negative for approximately 270° of each cycle.

In carrying the invention into effect in one form thereof a bridge circuit is provided. Two adjacent arms of the bridge are inductive impedances. A third arm comprises a capacitative reactance element and the reactance winding of a saturable reactor connected in series, while the fourth arm comprises a resistance and a capacitor connected in parallel.

Figure 1:
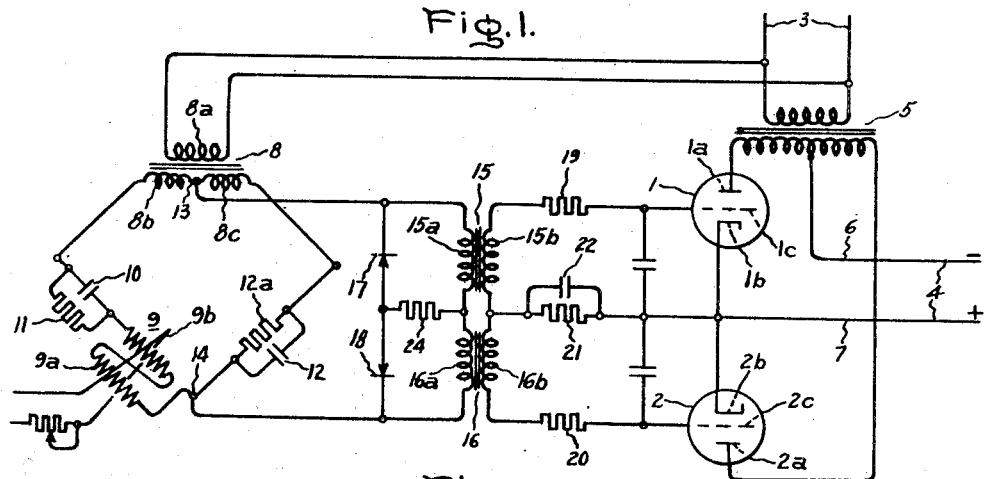
Figure 2:
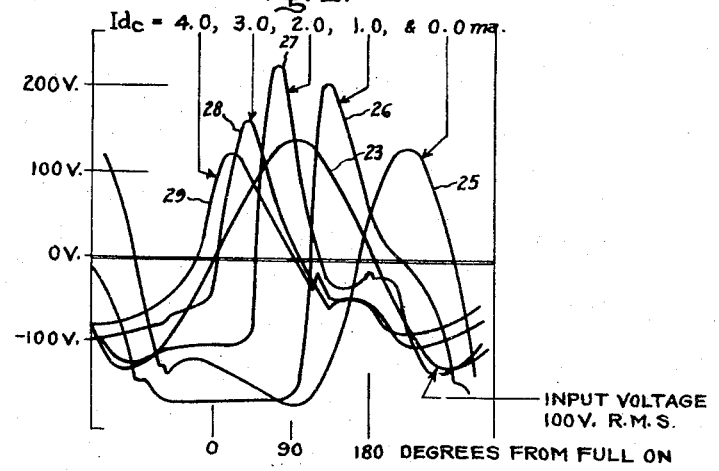
Figure 3:
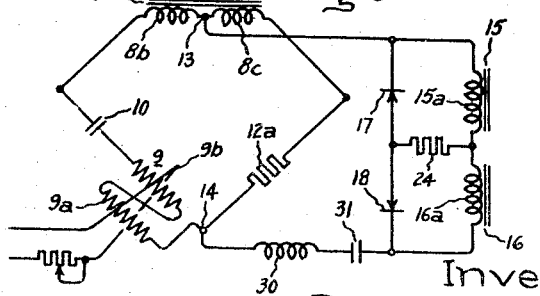

For a better and more complete understanding of the invention, reference should now be had to the following specification and to the accompanying drawing, of which Fig. 1 is a simple diagrammatical sketch of an embodiment of the invention; Fig. 2 is a chart of characteristic curves which illustrate operation of the invention, and Fig. 3 is a diagrammatical sketch corresponding to a portion of the circuit of Fig. 1 showing a modified form of the invention.

Referring now to the drawing, there is illustrated a pair of thyratrons 1 and 2 arranged in a system for transmitting energy from an alternating voltage source 3 to a direct current circuit 4. The anodes 1a and 2a of the thyratrons are connected to opposite terminals of the secondary winding of a transformer 5 of which the primary winding is connected to the source 3. The electrical midpoint of the secondary winding is connected to the conductor 6 which thus becomes the negative supply conductor of the direct current circuit and the cathodes 1b and 2b are connected to the conductor 7 which becomes the positive supply conductor. Control of the current conducted by the thyratrons is effected by supplying to the grids 1c and 2c a periodically varying voltage having the same periodicity as the anode voltage and by shifting the phase of the grid voltage relative to the anode voltage.

For this purpose a grid voltage phase shifting circuit is provided. It comprises a transformer 8 having its primary winding 8a connected to the source 3 and a secondary winding having two sections 8b and 8c connected in series relationship. Each of the sections contains inductive impedance and each section constitutes an arm of a bridge circuit. A third arm of the bridge comprises the reactance winding 9a of a saturable core reactor 9 connected in series with a capacitor 10 which is connected in parallel with a resistor 11. The fourth arm of the bridge comprises a capacitor 12 and a resistor 12a.

Between the opposite diagonal points 13 and 14 of the bridge is connected the output circuit which comprises the primary windings 15a and 16a of transformers 15 and 16. As shown, the two primary windings are connected in series relationship with each other. Across the outside terminals of the primary windings is connected a parallel circuit which comprises two oppositely poled rectifiers 17 and 18 connected in series relationship. These rectifiers may be of any suitable type. Preferably they are the well known selenium rectifiers.

The secondary windings 15b and 16b of transformers 15 and 16 are also connected in series relationship. The upper terminal of secondary winding 15b is connected through a resistor 19 to the grid 1c of thyratron 1 and the lower terminal of secondary winding 16b is connected through a resistor 20 to the grid 2c of thyratron 2. Between the junction point of the secondary windings 15b and 16b and the common cathode lead 7 is connected a resistor 21 and a grid bias capacitor 22 in parallel therewith.

The capacitance of capacitor 10 is chosen to provide resonance between the capacitor 10 and the reactance winding 9a of the saturable reactor when the reactor is approximately 75 per cent saturated.

With the foregoing understanding of the elements, the operation of the phase shifting circuit will readily be understood from the following description.

In the chart of characteristic curves illustrated in Fig. 2, the alternating voltage which is supplied to the primary winding 8a of the transformer and the voltage which is induced in the secondary windings 8b and 8c is represented by the curve 23.

With the saturable reactor 9 unsaturated, i. e. with zero direct current flowing in the saturating winding, a periodically varying voltage having both positive and negative values in each cycle appears across the output terminals 13 and 14. This voltage is applied to the primary windings 15a and 16a. During the half cycle of this voltage in which the upper terminal of the primary winding is positive, current flows through the primary winding 15a, resistor 24 and rectifier 18. Resistor 24 is of relatively low resistance and consequently primary winding 16a is effectively short-circuited by the rectifier during this half cycle. During the next half cycle current flows through primary winding 16a, resistor 24 and rectifier 17, and primary winding 15a is effectively short-circuited by rectifier 17. Thus the current which flows in the primary windings 15a and 16a is rectified and has a direct component.

This direct current component is eliminated from the voltage which is induced in the secondary windings since a direct current component cannot pass through a transformer. Consequently the rectified half wave currents in primary windings 15a and 16a cause alternating voltages to be induced in the secondary winding which are unsymmetrical about the zero axis.

For example, with zero direct current flowing in saturating winding 9b the voltage induced in secondary winding 15a during one cycle of the alternating voltage applied to the primary winding results in a grid voltage between grid 1c and cathode 1b of thyratron 1 which is represented by the curve 25 in Fig. 2. It will be noted that this voltage lags the input voltage approximately 180 electrical degrees. Further, it will be noted that this phase shifted voltage is unsymmetrical about the zero axis and that it is positive for approximately 90° and negative for approximately 270°. A voltage of similar wave shape but of opposite phase will be induced in the secondary winding 16b.

An increase in the direct current flowing in the saturating winding 9b of the reactor, e. g. an increase to one milliampere produces a phase shift of the voltage, i. e. a phase advance. The phase shifted voltage for this degree of saturation of the reactor is represented by the curve 26. It will be noted that the phase shifted voltage as represented by curve 26 has a very steep wave front. A voltage with a steep wave front is highly desirable as a grid voltage for thyratrons since it causes the thyratron to fire invariably at the same phase angle in each positive half cycle of anode voltage. In addition, it will be noted that the voltage represented by the curve 26 has a relatively high peak value. In the embodiment described, its positive maximum voltage is approximately 200 volts. This also is advantageous in tryratron control because with a high positive peak voltage applied to the grid, the resulting grid rectification produces a large negative bias, by charging grid bias capacitor 22, which is highly desirable and useful in preventing false operation of the thyratrons in response to extraneous signals such as fluctuations in supply voltage.

For increases in the direct currents flowing in the saturated winding to 2 milliamperes, 3 milliamperes and 4 milliamperes, the voltages induced in the secondary winding are correspondingly advanced in phase as represented by the curves 27, 28 and 29. It will be noted that throughout the phase shifting range the phase shifted voltage has the desirable characteristics mentioned in the foregoing, i. e. steep wave front high positive peak, high negative values, positive half cycle approximately 90°, negative half cycle approximately 270°.

In an embodiment which gives very satisfactory operation, the elements have the values listed in the following table:

| | | |
|---|---|---|
| Resistor 11 | ohms | 20,000 |
| Resistor 12a | do | 5,000 |
| Resistor 24 | do | 1,000 |
| Capacitor 10 | mf | 1.0 |
| Capacitor 12 | mf | .5 |
| Capacitor 22 | mf | .1 |
| Resistor 19 | megohm | .5 |
| Resistor 20 | do | .5 |
| Resistor 21 | do | 1.0 |

The unsaturated reactance of saturable core reactor 9 is equal to approximately four times the reactance of capacitor 10.

In a modified form, the resistor 11 and the capacitor 12 are omitted. A series filter comprising an inductance 30 and a capacitor 31 is connected in the output circuit of the bridge, as indicated in Fig. 3.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. An apparatus for producing a peaked voltage suitable for grid control of gaseous discharge devices and variable in phase with respect to a periodically varying voltage comprising a pair of inductors in adjacent arms of a bridge circuit configuration, a capacitive reactance element and the reactance winding of a saturable reactor connected in series to form a third arm of said bridge, a resistance and a capacitor connected in parallel to form the fourth arm of said bridge, a pair of transformers having their primary windings connected in series across the diagonal of said bridge circuit, a pair of oppositely poled rectifiers connected across said primary windings, each of said rectifiers being connected in parallel with a corresponding one of said primary windings to provide for alternately short-circuiting one of said windings during each half wave of voltage across said windings thereby to induce in the transformer secondary windings unsymmetrical voltages of which positive half cycles are of relatively short duration and negative half cycles are of relatively long duration.

2. A circuit for producing a phase shiftable voltage of peaked wave form suitable for the control of grid controlled gaseous discharge devices comprising a pair of transformer secondary windings in adjacent arms of a bridge circuit configuration, a saturable reactor and a capacitive reactance element connected in series relationship to form a third arm of said bridge, said reactance element comprising a first capacitor and a resistor connected in parallel with each other, a second resistor and a second capacitor connected in parallel relationship with each other to provide the fourth arm of said bridge, two additional transformers having their primary windings connected in series across the diagonal of said bridge between the junction point of said secondary windings and the junction point of said third and fourth arms and two rectifiers each connected respectively in parallel with one of said primary windings for causing the periodically varying voltages induced in the secondary windings of said additional transformers to be unsymmetrical about the zero axis with negative half cycles of relatively greater duration than the positive half cycles.

3. An apparatus for producing an unsymmetrical voltage variable in phase with respect to the voltage of a source of periodically varying voltage comprising a transformer having a primary winding connected to said source of periodically varying voltage, a pair of secondary windings on said transformer connected as adjacent arms in a bridge circuit configuration, a capacitor and the reactance winding of a saturable reactor connected in series to form a third arm of said bridge configuration, the reactance of said reactor winding being variable between a minimum value and a maximum value which is equal to approximately four times the reactance of said capacitor, a resistor and capacitor connected in parallel to form the fourth arm of said bridge, oppositely poled rectifiers connected in series across the diagonal of said bridge between the junction point of said transformer secondary winding and the junction point of said third and fourth adjacent arms, third and fourth transformers having their primary windings connected in series across the diagonal of said bridge, and a resistor connected between the junction point of said rectifiers and the junction point of said third and fourth transformer primary windings.

DANIEL F. LANGENWALTER.

REFERENCES CITED

The following references are of record in the file of this patent:

UNITED STATES PATENTS

| Number | Name | Date |
| --- | --- | --- |
| 1,893,772 | Garman | Jan. 10, 1933 |
| 1,900,538 | Bedford | Mar. 7, 1933 |
| 1,926,275 | Fitz Gerald | Sept. 12, 1933 |
| 2,084,900 | Edwards | June 22, 1937 |
| 2,228,843 | Palmer | Jan. 14, 1941 |
| 2,246,177 | Levoy | June 17, 1941 |